(12) United States Patent
Izrailit et al.

(10) Patent No.: US 9,874,494 B2
(45) Date of Patent: Jan. 23, 2018

(54) SENSOR FOR WEAR MEASUREMENT OF A BEARING

(71) Applicant: NanoLab, Inc., Waltham, MA (US)

(72) Inventors: Iosif Izrailit, Newton, MA (US); David L. Carnahan, Needham, MA (US)

( * ) Notice: Subject to any disclaimer, the term of this patent is extended or adjusted under 35 U.S.C. 154(b) by 0 days.

(21) Appl. No.: 14/838,685

(22) Filed: Aug. 28, 2015

(65) Prior Publication Data

US 2016/0216173 A1    Jul. 28, 2016

Related U.S. Application Data

(60) Provisional application No. 62/042,870, filed on Aug. 28, 2014.

(51) Int. Cl.
*G01M 13/04* (2006.01)
*F16C 41/00* (2006.01)
*F16C 17/24* (2006.01)
*F16C 19/52* (2006.01)

(52) U.S. Cl.
CPC ........... *G01M 13/04* (2013.01); *F16C 17/246* (2013.01); *F16C 19/522* (2013.01); *F16C 41/00* (2013.01)

(58) Field of Classification Search
CPC ...... F16C 17/246; F16C 19/522; G01M 13/04
USPC ................................................. 324/658–690
See application file for complete search history.

(56) References Cited

U.S. PATENT DOCUMENTS

| 3,102,759 | A | * | 9/1963 | Stewart | B61F 15/02 384/276 |
| 4,006,051 | A | * | 2/1977 | Board, Jr. | F16C 33/201 156/247 |
| 4,123,122 | A | * | 10/1978 | Gabrielson | F16C 23/045 384/300 |
| 7,551,288 | B1 | | 6/2009 | Discenzo | |
| 9,389,195 | B2 | * | 7/2016 | Izrailit | G01N 27/221 |
| 2005/0158511 | A1 | * | 7/2005 | Sabol | C23C 4/18 428/131 |
| 2009/0223083 | A1 | * | 9/2009 | LeCrone | F16C 17/02 34/524 |
| 2013/0160604 | A1 | * | 6/2013 | McNeil | F16C 23/045 74/594 |
| 2014/0103940 | A1 | * | 4/2014 | Izrailit | G01N 27/221 324/654 |
| 2014/0103942 | A1 | * | 4/2014 | Izrailit | G01N 27/221 324/662 |
| 2014/0169718 | A1 | * | 6/2014 | Peterson | F16C 33/32 384/569 |

(Continued)

*Primary Examiner* — Jeff Natalini
(74) *Attorney, Agent, or Firm* — Pandiscio & Pandiscio

(57) ABSTRACT

A bearing comprising a static component, a liner, a wear indicating sensor and a movable conductive component that will wear the liner, a) where the wear indicating sensor is first affixed to the static component, and said sensor is comprised of a first insulating layer in contact with the static component and a second conductive layer, configured such that the metallic layer and the static component are not in electrical contact, and b) where the liner is positioned between sensor and the moving component, where the liner comprises an insulating layer and a conductive layer, configured such that the insulating layer faces the moving metallic component, and the conductive layer faces the sensor, such that the conductive layer is in electrical contact with the conductive layer of the sensor.

10 Claims, 11 Drawing Sheets

(56) References Cited

U.S. PATENT DOCUMENTS

2015/0049970 A1\* 2/2015 Carnahan .............. F16C 17/246
 384/448
2015/0093059 A1\* 4/2015 Davis ................... F16C 23/043
 384/206

\* cited by examiner

SENSOR FOR WEAR MEASUREMENT OF A BEARING

REFERENCE TO PENDING PRIOR PATENT APPLICATION

This patent application claims benefit of pending prior U.S. Provisional Patent Application Ser. No. 62/042,870, filed Aug. 28, 2014 by NanoLab, Inc. and Iosif Izrailit et al. for SENSOR FOR WEAR MEASUREMENT, METHOD OF MAKING AND METHOD OF OPERATING SAME, which patent application is hereby incorporated herein by reference.

FIELD OF THE INVENTION

This invention relates to wear sensing devices in general, and more particularly to a sensor suited to the measurement of wear in bearings that employ a low friction wear lining material, instead of balls or rollers to support the load. More particularly, the invention relates to the electrical measurement of capacitance or other electrical impedance parameters between a movable surface and an electrode, which may be positioned within or on the back side of the wear liner, and its correlation to wear.

BACKGROUND OF THE INVENTION

Condition based maintenance programs rely upon inspection to identify those parts that are nearing their end of life. Bearings are no exception to this rule. The replacement of a bearing before it is fully worn out may be wasteful, but waiting too long to replace a bearing can be catastrophic in some applications, particularly with rotorcraft and aircraft. It is known in the art to place sensors inside a bearing to measure wear. Discenzo (U.S. Pat. No. 7,551,288) disclosed a system for monitoring bearing wear that employed an optical fiber embedded in the bearing and operatively coupled to an interferometric system. Such a system will measure wear at only one point, and that point may not coincide with the area of maximum wear. Bearings with multiple optical fibers were disclosed to try to remedy this defect, but the overall complexity required for this measurement rendered the solution cost prohibitive.

It is the goal of this invention to provide a sensor that will detect wear in any location within the bearing, and enable timely replacement, using a cost effective method.

SUMMARY OF THE INVENTION

It has occurred to these inventors that by inserting an electrode in or on the back of the wear liner in a bearing, it is possible to monitor the wear of the liner by monitoring the impedance parameters such as capacitance, inductance, and resistance, or combination thereof, between the electrode and a movable component, such as a shaft.

In the continued development of these sensors, we have determined that when a parameter such as capacitance is measured, the response is highly non-linear, showing a rapid increase when the liner is close to being completely removed. This is due to the 1/d factor in the calculation of capacitance, d being the liner thickness. As d approaches zero, the capacitance increases dramatically. It is advantageous to produce the sensor on a substrate that is relatively thin, between 0.001" and 0.004" so the mechanical properties of the bearing are not diminished. Accordingly, there is measurable capacitance between the sensor and the race that is constant. On the other side of the sensor is the wear liner that will be reduced in thickness, and the capacitance between the sensor and the moving element is the measured parameter. In practice, the measured quantity can have contributions from both the sensor-race capacitance and the sensor-moving element capacitance. The response increases drastically when the sensor to moving element thickness ('wearing side') wears down to less than the sensor-race thickness, as the wearing side will now dominate the response. We have recognized that it would be advantageous for the wearing side contribution to dominate the response earlier in the bearing life, so that a significant signal change is seen at any specified recommended replacement thickness.

For example, one liner may begin life at 0.0145" thickness and be recommended for replacement when it reaches 0.004" thickness. To gain sensitivity, either the capacitance between only the sensor to moving element must be measured, i.e. the race is not electrically in common with the moving element, or the thickness of the substrate must be 0.004" or thicker. One aspect of this invention is a third alternative solution to enable the response signal to dominate at any desired point in the wear of the bearing liner. This is to add a conductive material to the liner so that the 'electrical' liner thickness appears thinner than the physical liner thickness. This is readily accomplished by one of several methods. The first method is to add a conductive filler to the matrix that is used to bind the fiber cloth of the liner together, and to apply this to only one side of the liner. A standard unfilled matrix is applied to the wear surface, so that an interface between the two matrix materials exists within the cloth. On the sensor side, the conductive additive is in contact with the sensor electrode. On the wearing side, the moving element is in contact with the un-modified, insulating matrix, and can wear through the liner as normal. By changing the depth where the interface between the insulating matrix and the conductive matrix is located, the response of the sensor can be tailored.

Another avenue to achieve the same result is to add one or more conductive fibers to the cloth, in a weave that does not allow the conductive fibers to contact both surfaces of the cloth. The cloth would then be laid-up with the conductive fibers contacting the electrode area of the sensor, and the nonconductive fibers facing the moving component.

Also in the further development of these sensors, we recognize that many bearings are exposed to contamination during their life. These contaminants include water, deicing fluids, oils, greases, dusts, metal filings and the like. When these contaminants have significant conductivity or even a different dielectric constant from air, they can alter the measured values from these sensors. Cleaning and drying the bearings before electrically evaluating the wear is one way to address this issue. Another way is to employ segmented sensors, so that a differential or bridge measurement can be taken, as the effects of contamination would be similar for both segments.

A third issue is that in many applications, the wear is not symmetric around the circumference of the bearing, which leaves some points of the liner at or near the original thickness, while other points are significantly worn. The use of segmented metallic electrodes within the same bearing can offer more detailed information about the wear of these liners. A differential or bridge measurement between the worn area and the unworn area can be used to extract the wear data.

In one preferred form of the invention, there is provided a bearing comprising a static component, a liner, a wear indicating sensor and a movable conductive component that will wear the liner, a) where the wear indicating sensor is first affixed to the static component, and said sensor is comprised of a first insulating layer in contact with the static component and a second conductive layer, configured such that the metallic layer and the static component are not in electrical contact, and b) where the liner is positioned between sensor and the moving component, where the liner comprises an insulating layer and a conductive layer, configured such that the insulating layer faces the moving metallic component, and the conductive layer faces the sensor, such that the conductive layer is in electrical contact with the conductive layer of the sensor.

In another preferred form of the invention, there is provided a wear liner comprising a layer that is insulating and a layer that is conductive.

In another preferred form of the invention, there is provided a method of measuring the wear of a bearing, by measuring the resistance between a moving metallic component and a sensor electrode that is attached to the wear liner and is electrically isolated from the race.

In another preferred form of the invention, there is provided a method of measuring the wear of a bearing, by measuring electrical parameters of the wear liner between a moving metallic component and the race, where the liner has insulating and conductive layers.

In another preferred form of the invention, there is provided a bearing comprising a race, a liner, a wear indicating sensor and a moving metallic component that will wear the liner, a) where the wear indicating sensor is mounted on the surface of the race, and is comprised of an insulating substrate layer upon which two or more segmented metallic layers are deposited, such that the segments of the metallic layer are not in electrical contact, and the metallic layer is electrically insulated from the race by the substrate layer, and b) the segmented metallic layers are arranged to detect wear in a particular portion of a bearing.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein.

DETAILED DESCRIPTION OF THE PREFERRED EMBODIMENTS

Figure 1:
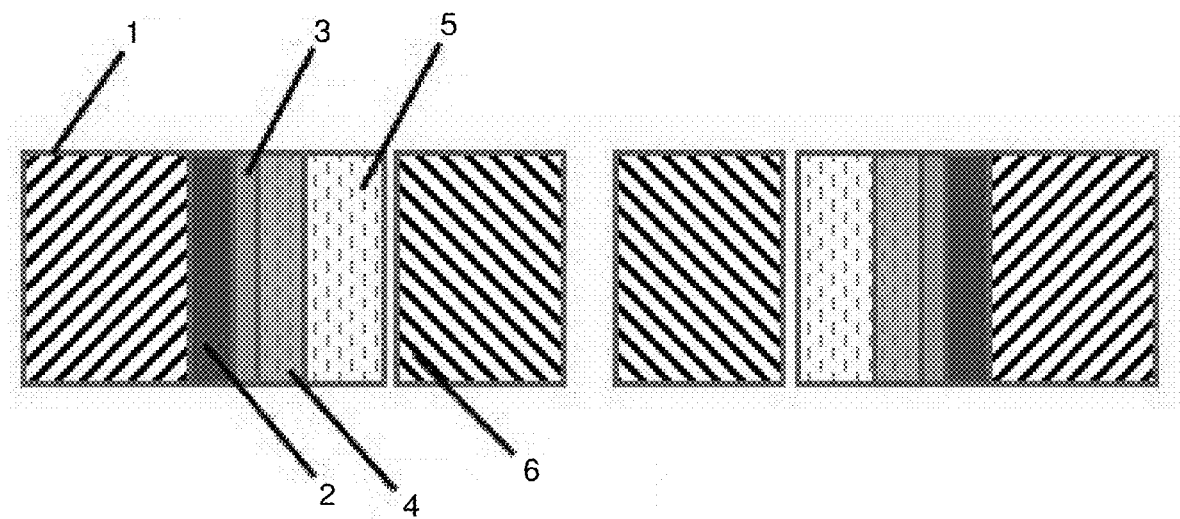
FIG. 1 is a schematic cross-sectional view of a lined bushing formed in accordance with the present invention.

A lined bushing according to the present invention, as shown in a cross section view in FIG. 1, consists of a race 1, to which a sensor is applied, wherein the sensor comprises an insulator 2 and a metallic electrode 3. The liner is applied to the sensor, and comprises a conducting portion 4 and an insulating portion 5, configured such that when the moving component 6 wears away the insulating portion, there will be measurable (<1 Mega-ohm) electrical contact between the electrode 3 and the moving component 6. The capacitance between the moving component 6 and the electrode 3 could also be measured according to the present invention, but the effective dielectric thickness of the capacitor is only that of the insulating portion 5, as there is electrical contact between the sensor 3 and the conductive portion 4.

It is advantageous to engineer the thickness of the conductive section 4 with respect to the insulating section 5, so that an electrically measurable event occurs at or near the amount of wear that is the maximum allowable wear for the application. As an example, if resistance was being measured, and a liner was produced having a 0.004" thick conductive portion and a 0.010" thick insulating portion, the transition from high resistance state to a low resistance state (<1 Mega-ohm) would occur when the 0.010" material was completely worn away. For some applications, the recommended replacement point occurs when the liner is worn to a thickness less than 0.004".

As another example, if capacitance was being measured, the magnitude of the capacitance would be related to the thickness, less the wear, of the insulating portion of liner, as measured between the moving component, which serves as one electrode, and the conductive portion of the liner, which serves as the other. This conductive portion of the liner may be electrically connected to the sensor electrode to facilitate measurement. In addition to the capacitance, the Q factor, which relates to electrical loss, is also able to provide useful measurement data. Before the wear is sufficient to break through the insulating liner, the Q factor will remain high, but this will drop quickly once the wear is sufficient to make contact between the conductive portion of the liner and the moving component.

Figure 2:
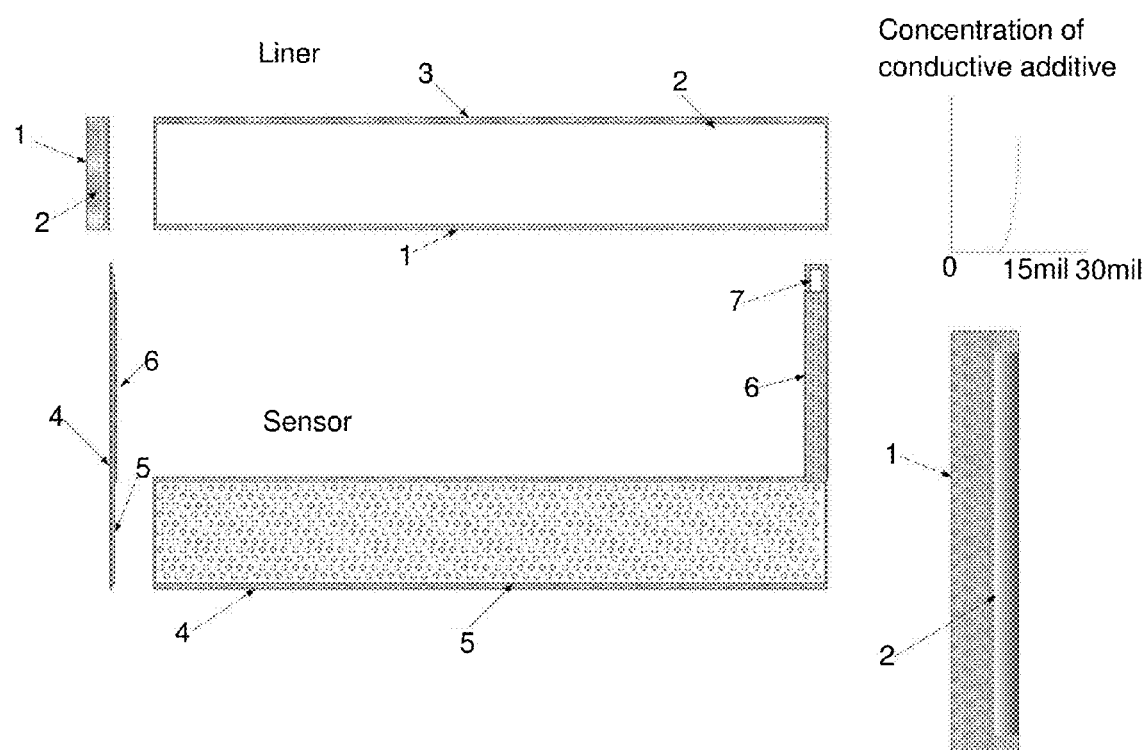
FIGS. 2 and 3 are schematic views showing conducting and insulating portions of a wear liner formed in accordance with the present invention.

Now referring to FIG. 2, a wear liner comprises an unfilled area that is the wear material 1, and a second area 2 that is the wear material plus an additive to impart conductivity. The additive concentration in the conductive area 2 may be constant or be a gradient. The liner is applied to the sensor so that the conductive area 2 is in electrical contact with the metallization 5 of the sensor. The senor itself has no coverlay atop the metal electrode 5, except where the electrical lead is positioned 6, up to the probe point 7, which also remains exposed. The probe point 7 is favorably coated with a corrosion resistant metal. Optionally, the flexible insulator substrate 4 may be slightly oversized compared to the metallization 5, and the unfilled liner 1 may also be oversized compared to the conductive area 2.

The transition between the conducting and insulating portions of the wear liner need not be a gradient as shown in FIG. 2. A multi-step or a single step transition of the conductive additive concentration can also be utilized. When the liner is implemented with a gradient of conductive additive, where the concentration of the additive is lowest near the moving component and highest near the race, the conductivity will increase as a function of wear. Likewise with a multi-step system, where the concentration of the additive increases as a function of distance, the electrical response (e.g., conductivity) will increase with wear. A step function may also show some resistance change with wear past the transition point.

Figure 3:
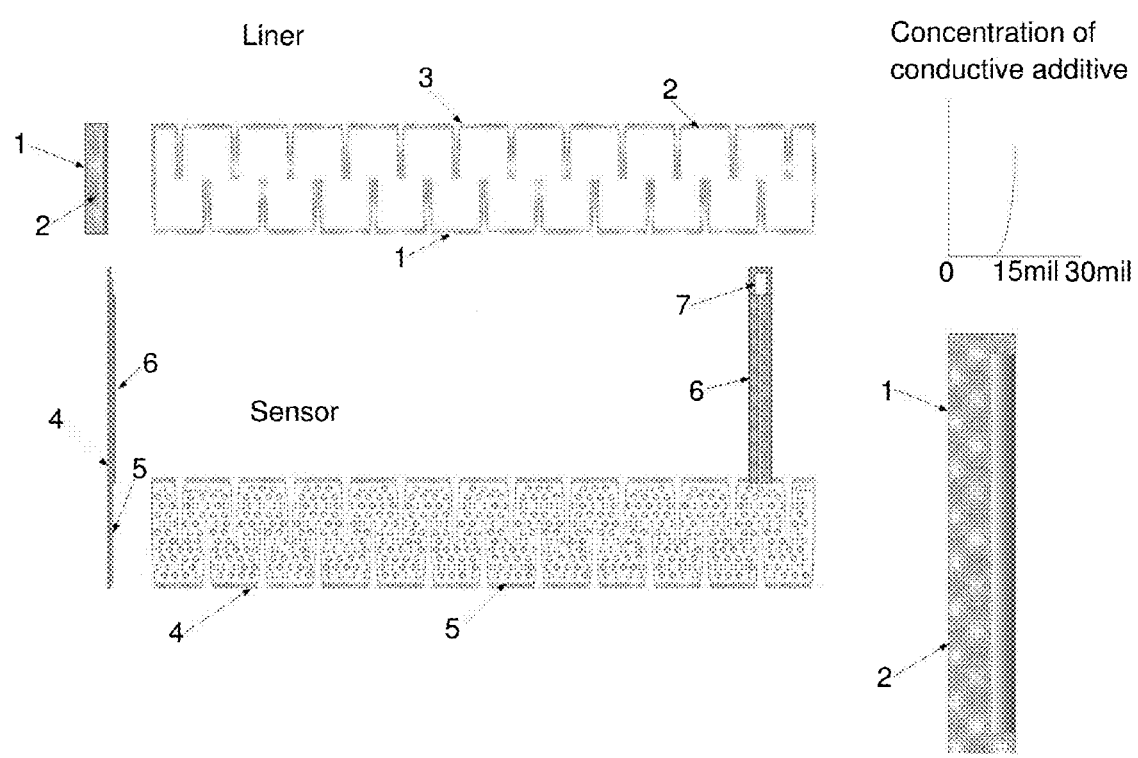

In FIG. 3 the same elements of construction are present as in FIG. 2, with the sole intended difference being the shape of the substrate and metallized region of the sensor. The slits in the substrate allow the sensor to conform to a portion of a sphere. There are a number of other shapes that enable a planar material to approximately conform to a spherical shape, this is but one.

Figure 4A:
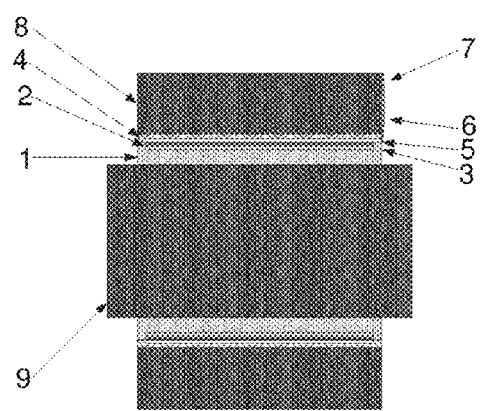
FIGS. 4A and 4B are schematic views showing two bearings formed in accordance with the present invention.
Figure 4B:
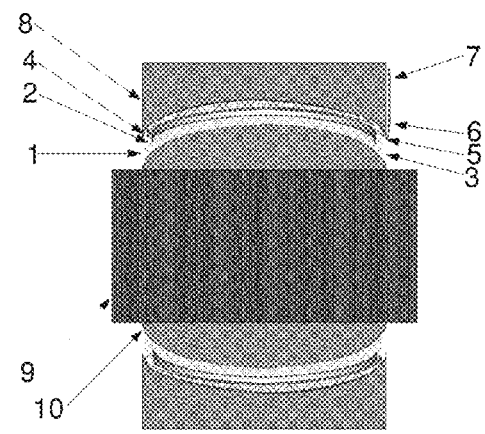

In FIG. 4, two types of bearings are shown. In FIG. 4A, a sleeve bushing is shown, incorporating an electrically insulating liner 1, a conductive portion of the liner 2, an optional extension of the insulating component over the edges of the conductive portion 3, a sensor comprising a flexible insulating substrate 4 and a metallized layer 5. The sensor is applied to the inside of the race 8, so that the metallization layer 5 of the sensor is not in electrical contact with the race 8. The two-part liner is then attached to the sensor, such that the metallization layer is in electrical contact with the conductive portion 2 of the liner, and the insulating portion of the liner faces the shaft 9. A lead and contact point 7 emerge from the sensor and are affixed to the race 8. In FIG. 4B, the spherical equivalent of the sleeve bushing shown in FIG. 4A is given.

Figure 5:
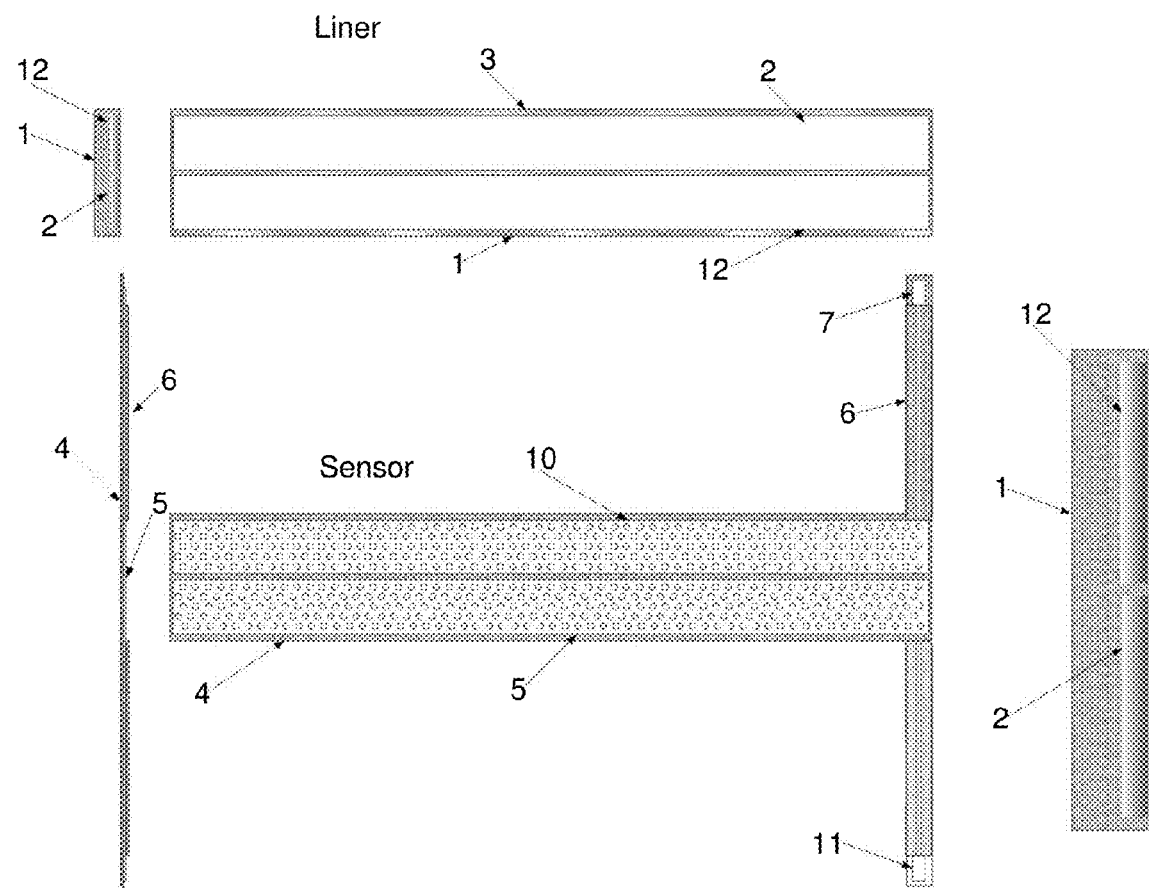
FIG. 5 is a schematic view showing a sensor for a bushing that splits the sensing areas into two segments.

In FIG. 5, a sensor is shown for a bushing that splits the sensing areas into two segments, although more could be used. The sensor of FIG. 5 has two separate leads 6 to monitor each side of the bushing. The presence of multiple segments allows for either separate measurement of each segment, or a differential measurement. The segmented sensor can be utilized with an insulating liner, and employ capacitive measurement or Q factor measurement as previously disclosed, or it could be used with a liner having a conductive areas (2 and 12) within the liner 1. In such an implementation, the conductive areas are electrically insulated from each other. An alternative end of life test could be to measure when the areas become electrically conducting, by being shorted by the shaft. In that instance, the resistance between electrode pads 7 and 11 would be low.

Figure 6:
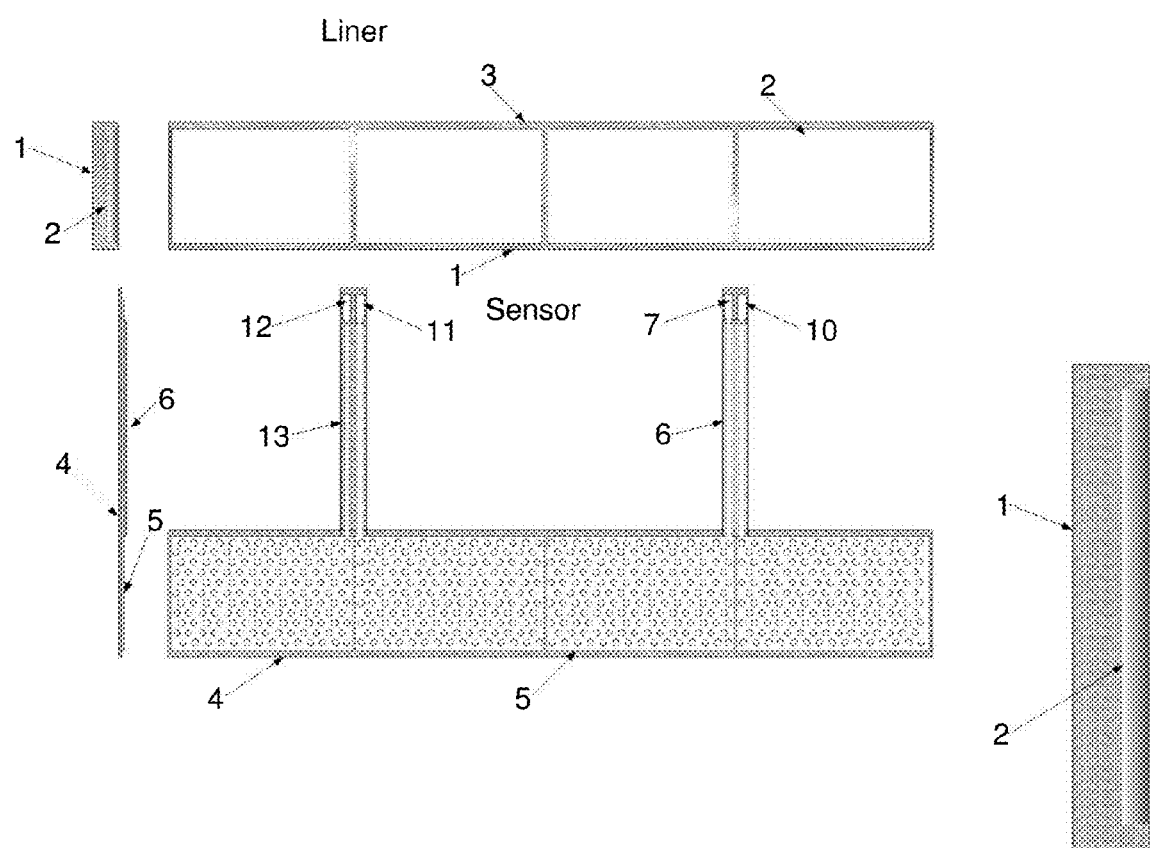
FIG. 6 is a schematic view showing a sensor that has four separate electrode leads on two traces to monitor each quadrant of the bushing.

In FIG. 5, a sensor is shown for a bushing that splits the sensing areas into four segments. The sensor of FIG. 6 has four separate electrode leads on two traces 6 and 13 to monitor each quadrant of the bushing. The presence of multiple segments allows for either separate measurement of each segment, or a differential measurement. The segmented sensor can be utilized with an insulating liner, and employ capacitive measurement or Q factor measurement as previously disclosed, or it could be used with a liner having a conductive areas 2 within the liner 1. In such an implementation, the conductive areas are electrically insulated from each other. An alternative end of life test could be to measure when the areas become electrically conducting, by being shorted by the shaft. In that instance, the resistance between two electrode pads (7, 10, 11 or 12) would be low.

Figure 7:
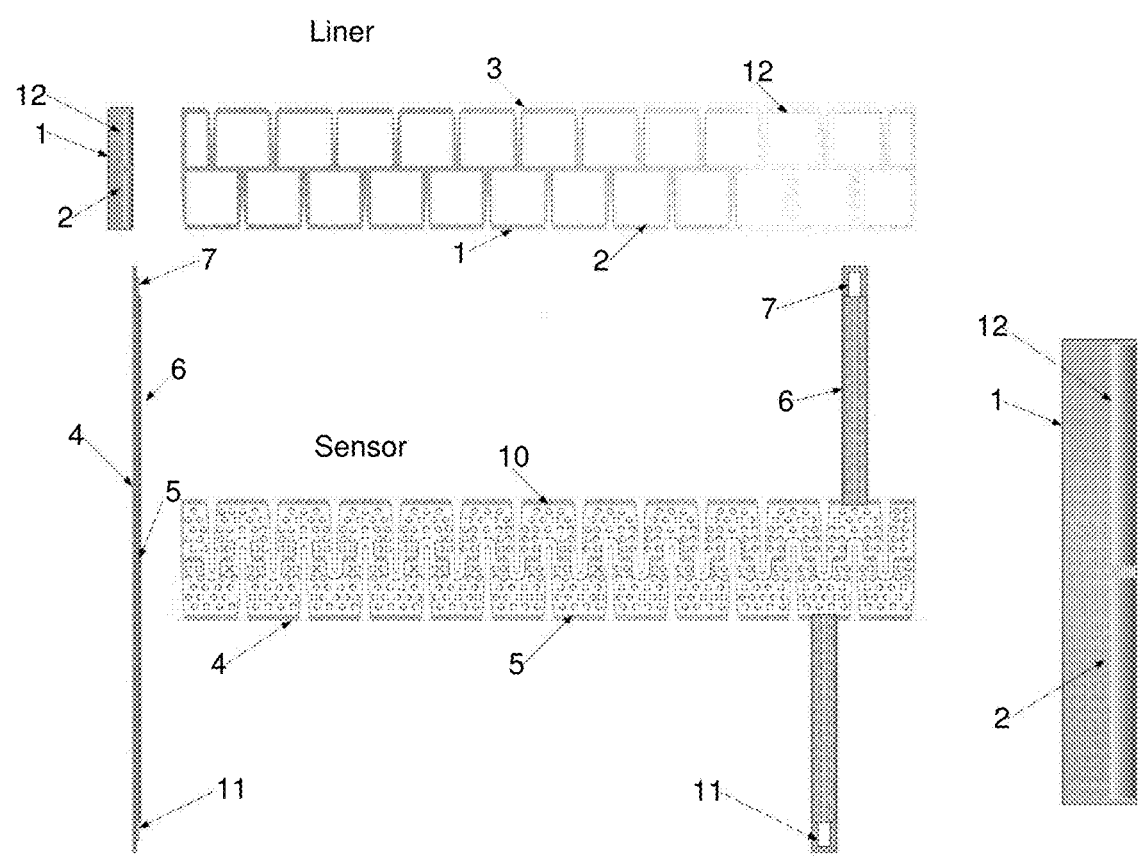
FIG. 7 is a schematic view showing a segmented electrode sensor for a spherical bearing.

In FIG. 7, a segmented electrode sensor for a spherical bearing is given. Similar to FIG. 5, the sensor employs one or more leads per side, and enables either individual or differential measurement between segments. In instances where one side of a spherical bearing is loaded more heavily than another, the segmented electrode design would enable more sensitive detection of wear. This design can be employed with an insulating liner, or with the multi-part liner (1) having conductive areas (2 and 12). The conductive areas are electrically separated to enable top-bottom or left/right measurements. When measurable resistance is detected between electrode pads 7 and 11, it is another clear signal that the ball has worn through the insulating portion of the liner and shorted the electrodes of the sensor (5 and 10). The differential measurement should also help to mitigate the effects of contaminants.

Figure 8:
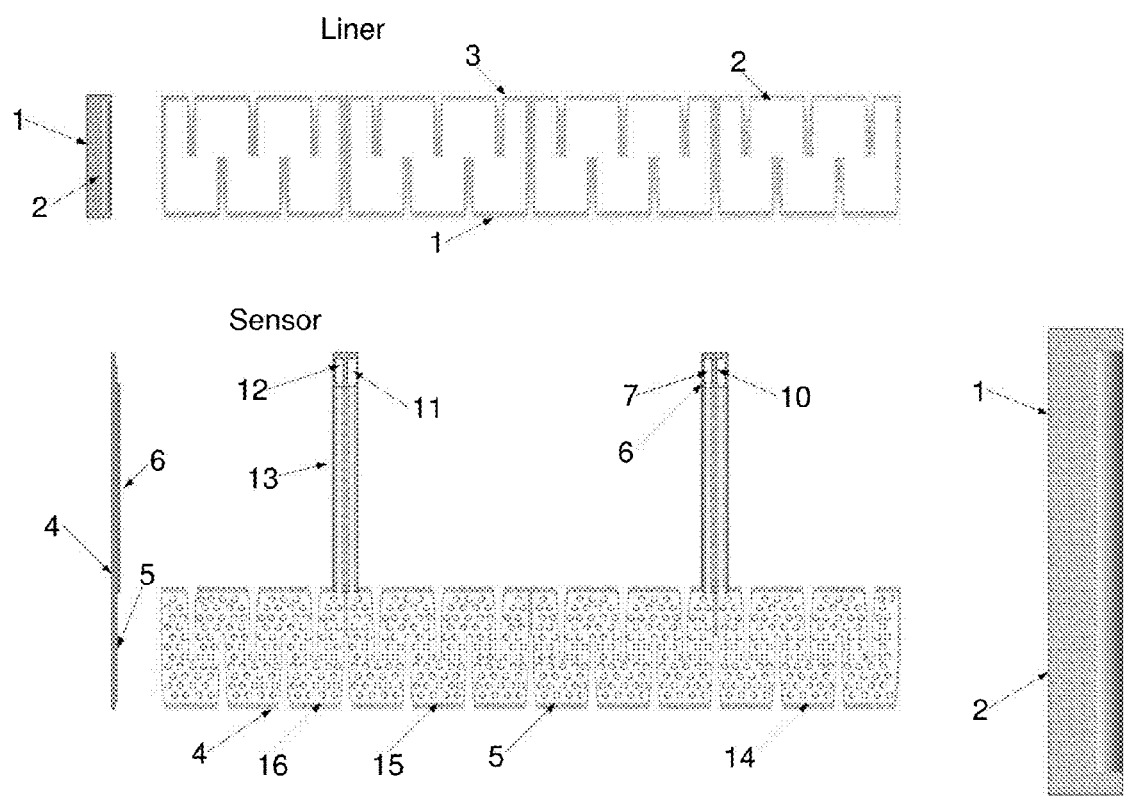
FIG. 8 is a schematic view showing a circumferentially segmented bearing sensor.

In FIG. 8, a circumferentially segmented bearing sensor is given. In this case, the electrode area is divided into a number of segments around the perimeter of the ball, and enables both individual and differential measurement, similar to FIG. 6. Like other implementations, the segmented sensor can be used with an insulating liner or a multipart liner that has conductive areas. It is important to provide electrical insulation between segments if a multi-part liner is used. If any two electrode segments become electrically shorted, it is another signal that the ball has worn through the liner down to the point where the ball contacts the conductive areas. With 4 segments, the sensor will detect 4 quadrants.

Figure 9:
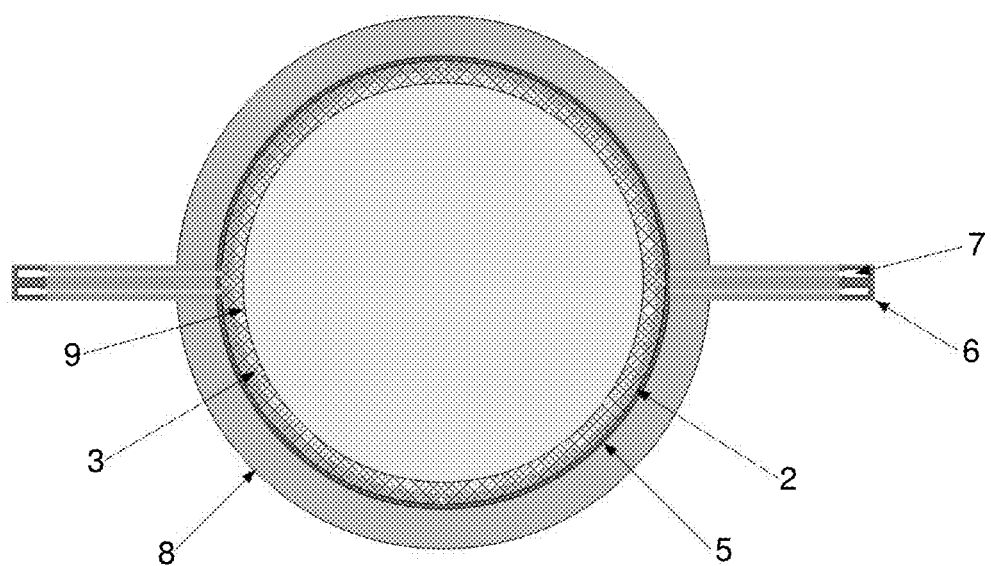
FIG. 9 is a schematic end view of a sleeve bushing instrumented with a 4 segment circumferential sensor.

FIG. 9 shows an end view of a sleeve bushing instrumented with a 4 segment circumferential sensor. The shaft 9 wears against an insulating top surface of liner 3 until it wears into the conductive areas 2 of the liner. At that moment, the shaft is in contact with the conductive area, and the conductive area is in contact with the sensor electrode 5. Accordingly, between the shaft and one or more of the electrode pads (7), there will be an electrical short, which can be evidenced by measuring resistance or loss factor Q. In cases of radial load, such a circumferentially segmented sensor can provide higher sensitivity to wear. A differential measurement can also be made to compare capacitance changes, related to wear, before the shaft has worn down to the conductive areas. The segmented sensor can also be used with only an insulating liner, one that does not have conductive areas. In such a case, the wear of the liner will change the capacitance between the ball and the segment electrodes. If Q falls to near zero, this indicates that the liner has been completely worn through to the segment electrode.

Figure 10:
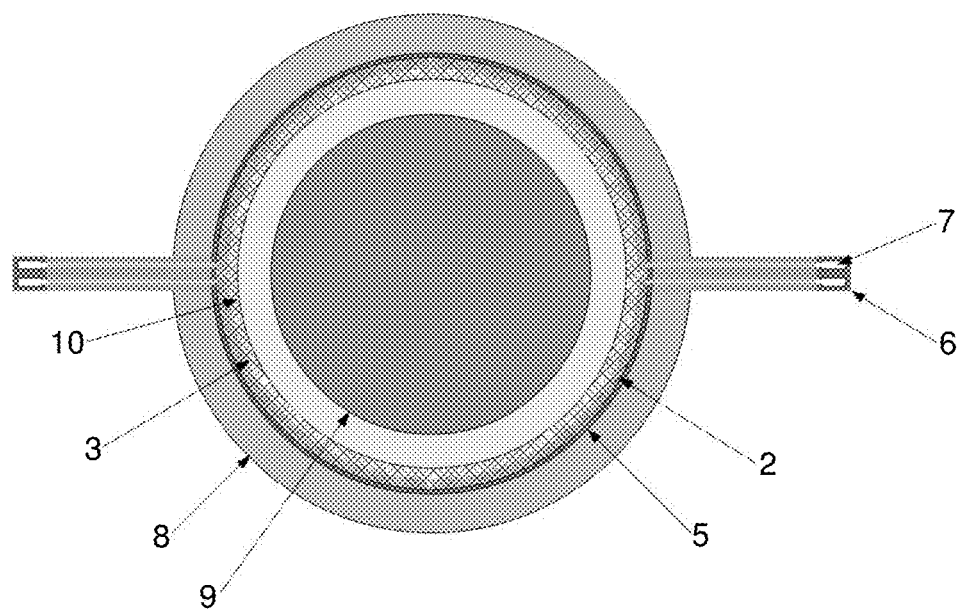
FIG. 10 is a schematic view showing a spherical bearing implemented with a circumferentially segmented sensor.

FIG. 10 shows a spherical bearing implemented with a circumferentially segmented sensor. In this image, 4 segments are shown, but any convenient number could be envisioned. The ball 9 wears against a multi-part liner 3 which has both insulating areas and also conductive areas which are in electrical contact with the electrode pads 5, which are insulated from, and affixed to the race 8. Between the ball and one of the electrical leads 7, a short will indicate wear that has progressed to the location of the interface between the conducting and insulating portions of the liner. By engineering the liner, that interface can occur at or just before the maximum allowed wear for the application, so that replacement can be conducted at the recommended service interval.

Figure 11:
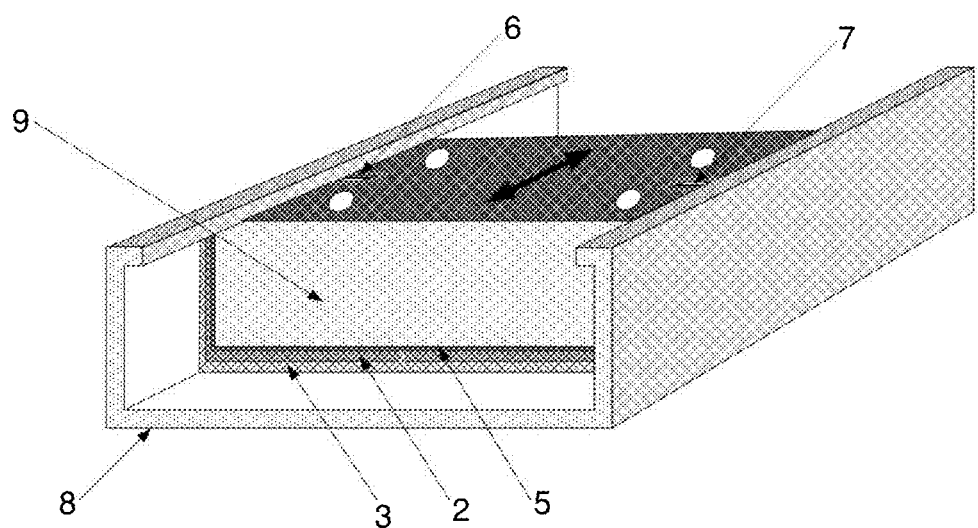
FIG. 11 is a schematic view showing a sensor integrated into a linear bearing.

We recognize that these features and aspects can be implemented with a linear bearing as well, and use much of the same construction. FIG. 11 shows a sensor integrated into a linear bearing. For the purposes of illustration, the block 9 is free to move within the confines of the channel 8. The wear liner 3 is interposed between the block 9 and the channel 8. The liner in FIG. 11 comprises two layers, having an insulating layer and a conductive layer 2, which is in electrical communication/contact with the sensor electrodes 5, which terminate in separate electrode pads 6 and 7. The pads 6 and 7 can be used to gauge, via electrical means, any wear of the liner on either side of the channel. Configurations similar to FIG. 11, where the channel travels and the block is fixed are also anticipated. Alternative constructions employing a shaft and a carriage, are also anticipated.

Modifications of the Preferred Embodiments

It should be understood that many additional changes in the details, materials, steps and arrangements of parts, which have been herein described and illustrated in order to explain the nature of the present invention, may be made by those skilled in the art while still remaining within the principles and scope of the invention.

What is claimed is:

1. A bearing comprising a static component, a liner, a wear indicating sensor and a movable conductive component configured to wear the liner, wherein
   a) the wear indicating sensor is affixed to the static component, wherein the wear indicating sensor comprises a first insulating layer in contact with the static component and a conductive layer configured such that the conductive layer and the static component are not in electrical contact, and
   b) the liner is positioned between the conductive layer of the wear indicating sensor and the movable conductive component, wherein the liner comprises a second insulating layer configured such that the second insulating layer faces the movable conductive component and is in electrical contact with the conductive layer of the wear indicating sensor;
   wherein the movable conductive component comprises a first electrode, the conductive layer comprises a second electrode, and the liner comprises a dielectric medium disposed between the first electrode and the second electrode; and
   wherein the wear indicating sensor is configured to measure the capacitance between the first electrode and the second electrode, whereby to determine the amount of wear of the liner.

2. The bearing of claim 1, where the movable conductive component is a shaft.

3. The bearing of claim 1, where the movable conductive component is a spherical ball.

4. The bearing of claim 1, where the movable conductive component is a carriage of a linear bearing.

5. The bearing of claim 1, wherein the liner comprises a matrix material, wherein the matrix material is configured such that the side of the matrix material facing the movable conductive component is insulating, and the side facing the conductive layer is conducting.

6. The bearing of claim 1, wherein the liner comprises a matrix material, wherein the matrix material is configured such that the side of the liner facing the movable conductive component is insulating, and the matrix material on the side of the line facing the conductive layer is filled with a conductive additive, such that the additive is in electrical contact with the static component.

7. The bearing of claim 1, wherein the liner comprises a wear resistant composite material comprising a filler and a matrix material, wherein the wear resistant composite material on the side of the liner facing the movable conductive component is insulating, and wherein the wear resistant composite material on the side of the liner facing the static component is conductive.

8. The bearing of claim 1, where the movable conductive component is metallic.

9. The bearing of claim 1, where the static component comprises a race.

10. The bearing of claim 9, where the race is metallic.

* * * * *